United States Patent [19]

Guth

[11] 3,816,061

[45] June 11, 1974

[54] FUEL MIXING CHAMBER FOR HEATING TORCHES

[76] Inventor: Carl R. Guth, 10215 N. 38th St., Phoenix, Ariz. 85020

[22] Filed: Dec. 4, 1972

[21] Appl. No.: 311,671

[52] U.S. Cl............. 431/352, 239/416.5, 431/354, 239/416.4
[51] Int. Cl.......................... F23d 15/02, B05b 7/06
[58] Field of Search ........... 431/351, 352, 353, 354; 239/416.4, 416.5, 416.3, 417.3, 433, 434; 137/604

[56] References Cited
UNITED STATES PATENTS
1,853,277  4/1932  Johnston........................... 239/416.5
3,588,304  6/1971  Guth................................... 431/352

FOREIGN PATENTS OR APPLICATIONS
8,560  6/1889  Great Britain...................... 431/354

*Primary Examiner*—Carroll B. Dority, Jr.
*Assistant Examiner*—Harold Joyce
*Attorney, Agent, or Firm*—Warren F. B. Lindsley

[57] ABSTRACT

A gas mixing chamber and method of mixing fuels for a fuel burning torch utilizing air resistance or drag together with air aspiration to draw fuel from a pair of nozzle tips sequentially arranged in the torch and to mix the air in two stages with the expanding gases or liquids in highly efficient manner to create a thorough mixing of the air and fuel to effect complete combustion.

6 Claims, 3 Drawing Figures

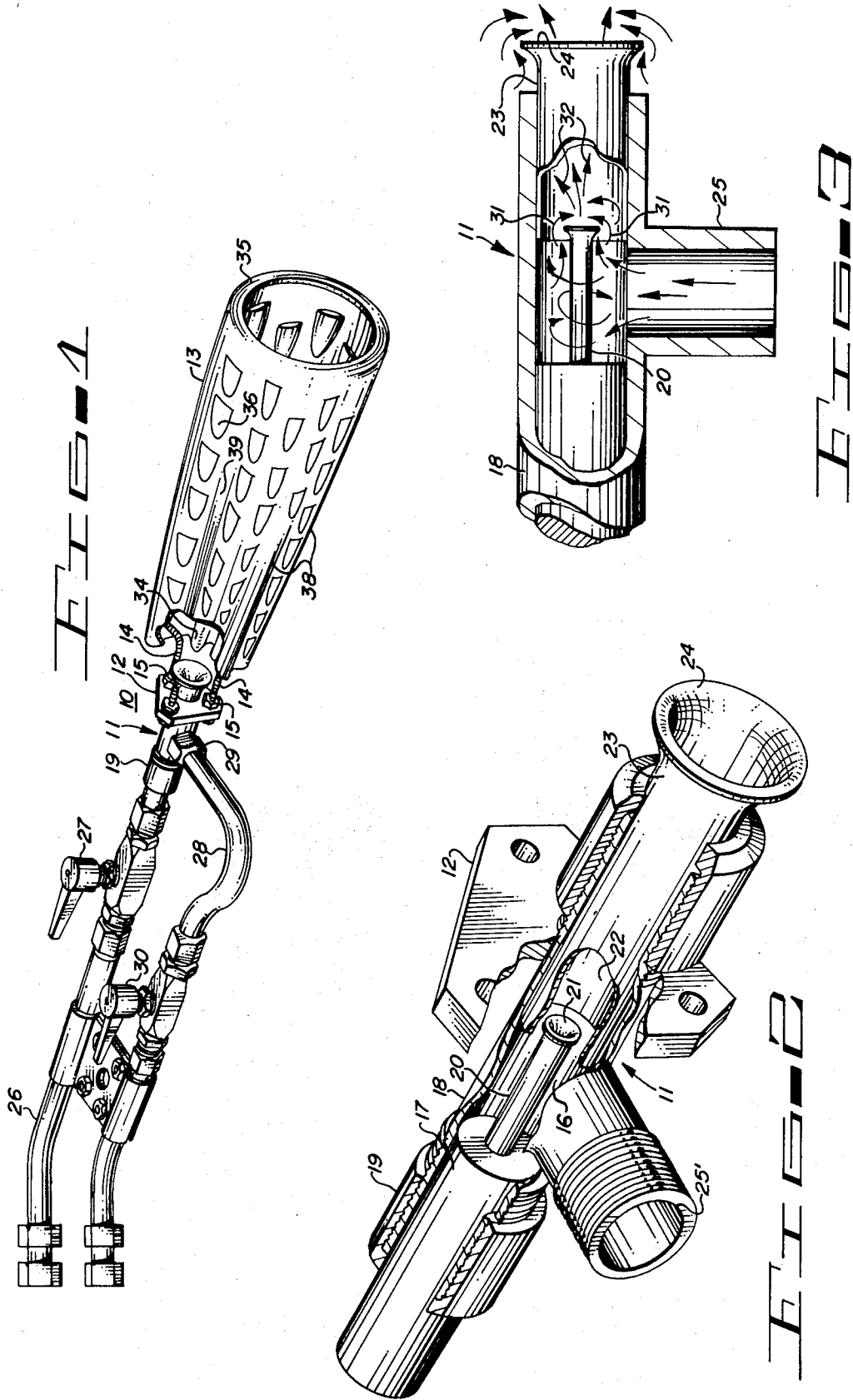

FUEL MIXING CHAMBER FOR HEATING TORCHES

BACKGROUND OF THE INVENTION

This invention is directed to fuel burners such as heating torches and is more particularly directed to an improved fuel mixing chamber which is so designed that fuel and air turbulence is utilized fully in sequential steps to aid combustion of the expanding fuel gases or liquids jetting into a shroud.

Heretofore, the fuel mixing chambers were merely designed to provide the necessary space to mix the fuel and compressed air supplied to the burner. This resulted in incomplete combustion or at best erratic flame action.

FIELD OF THE INVENTION

This invention is particularly directed to a fuel mixing chamber for a burner utilizing a fluted tapered shroud chamber, which in a sequential controlled manner, increases fuel mixture to more completely burn liquid or gaseous fuels for producing a high temperature flame. The mixing chamber, through its design configuration, thoroughly mixes the fuel in sequential zones of turbulence to completely diffuse the air and fuel to raise the flame of the torch to a higher temperature during use than heretofore possible.

DESCRIPTION OF THE PRIOR ART

At the present time mixing chambers in fuel distributors have not taken effective advantage of the mixing air for aiding in the complete combustion of burning liquids or gases. This has occurred because sufficient turbulence had not been generated to thoroughly mix the air with the incoming fuel in the mixing chamber and consequently the flames in the shroud of the torch have not reached the temperatures possible and much of the fuel has been wasted through unburned or not fully consumed gases. By slowing down the forward motion of the fuel mixture or reduce its kinetic energy, time is provided for the fuel to mix and more completely burn in the burner shroud.

SUMMARY OF THE INVENTION

In accordance with the invention claimed, a new and improved method of mixing fuel in a chamber is provided for a fuel burner which, through its unique configuration, mixes air and fuel more thoroughly than heretofore possible through fuel aspiration, turbulence and diffusion for obtaining an efficient consumption of the fuel gases.

It is, therefore, one object of this invention to provide an improved fuel mixing chamber for fuel burners which effectively utilizes air under pressure and atmospheric air for fuel aspiration to created turbulence for efficient fuel consumption.

Another object of this invention is to provide an improved fuel mixing chamber employing two zones of fuel expansion wherein turbulence is created in each zone by the chamber design mixing the air with the expanding gases to effect complete combustion.

A further object of this invention is to provide an improved fuel mixing chamber or distributor for a torch which utilizes gas resistance or drag to slightly retard the forward movement of the gas to create delay and turbulence in the gas to more thoroughly mix the fuel and air in the gas for more efficient combustion.

A still further object of this invention is to provide an improved fuel mixing chamber utilizing a gas discharge nozzle having a flared orifice for discharging one gas and forming a drag for another gas moving over its outer periphery past the flared orifice, said nozzle producing eddies at its flared orifice for effectively mixing both of the gases.

A still further object of this invention is to provide an improved fuel mixing chamber for a torch utilizing air resistance in the complete mixing of the fuel gases.

Further objects and advantages of this invention will become apparent as the following description proceeds and the features of novelty which characterize this invention will be pointed out with particularity in the claims annexed to and forming part of this specification.

BRIEF DESCRIPTION OF THE DRAWING

The present invention may be more readily described by reference to the accompanying drawing, in which:

FIG. 1 is a perspective view of a gas burner incorporating an improved fuel mixing chamber and embodying the features of this invention;

FIG. 2 is an enlarged fragmentary view with parts broken away of the fuel mixing chamber of FIG. 1; and FIG. 3 is an enlarged fragmentary sectional view of the nozzle element of the fuel mixing chamber of FIGS. 1 and 2.

DESCRIPTION OF THE PREFERRED EMBODIMENT

FIG. 1 illustrates one embodiment of this invention where a gas and liquid fuel burner or heating torch 10 is shown comprising a main support element 11 which may take the form of a conventional pipe T-shape having an integral flange 12 to which is secured the burner flame shroud 13 by suitable studs 14 and nuts 15. The stud and nut arrangement make it possible to adjustably position the shroud at predetermined positions with reference to flange 12.

A gas distributor or chamber 16 is arranged to extend within the T-shaped main support element 11 and comprises, as more clearly shown in FIGS. 2 and 3, a hollow cylindrical member 17 slidably moveable within the leg 18 of support element 11 and held therein by a collar 19 threadedly secured to the end of leg 18. At the forward end of the hollow cyindrical member 17 and within its hollow opening is fixedly positioned the hollow nozzle 20. Nozzle 20 is tapered or bell shaped at its open end 21 and extends within the hollow axial opening 22 of a second larger nozzle 23. The opening 22 extending through nozzle 23 is of a much larger diameter than the flared end 21 of nozzle 20. At the outer end of nozzle 23 is a tapered or bell shaped flared end 24.

As noted from the drawing, leg 25 of the T-shaped support element 11 opens into the support element along the longitudinal axis of nozzle 20 and discharges gas around the outer periphery of nozzle 20.

As shown in FIG. 1, the bell shaped flared end 24 is positioned within the entrance of shroud 13.

Rearwardly of collar 19 and adjacent the end of the hollow cylindrical member 17 is axially disposed an air inlet port 25'. This port 25' is axially aligned with the hollow opening through member 17. Compressed air is provided by pipe 26, controlled by a suitable valve 27.

Gas or liquid fuel is supplied through an inlet pipe 28 and port 29 connected to the hollow interior of the leg 25 of main support element 11. Pipe 28 is controlled by a suitable valve 30. As the fuel proceeds through the fuel jet passageway or pipe 28 and out its port 29, air under pressure is flowing out through the flared end 21 of nozzle 20 and combines with the fuel as ignition takes place.

In order to effectively mix the air and fuel for complete burning action, the fuel movement through the burner must be delayed sufficiently to permit thorough mixing to occur. This is accomplished in the disclosed burner by flaring outwardly the end of nozzle 20. As the fuel is ejected out of leg 25 of the T-shaped configuration of the main support element 11, it surrounds the outside periphery of nozzle 20 and as it moves toward its flared end 21, its movement is retarded by the drag offered by the flared end of nozzle 20, as shown by the arrows 31 in FIG. 3. This delay is enough to cause more thorough mixing of the fuel with the air being expelled outwardly from the hollow interior of nozzle 20. Since it is more important that the fuel be delayed at this point the drag is provided in the fuel line of the burner. The arrows 32 in FIG. 3 represent the movement of air out of nozzles 20.

As this mixture of air and fuel moves through the burner and out of the flared end 24 of nozzle 23, the mixture is again thoroughly mixed with secondary air drawn into the shroud 13 of the burner by the effects of aspiration.

In order to effectively burn the fuel mixture of the compressed gases transmitted to the burner to obtain complete combustion, a shroud must be provided for controlling the mixing gases and a suitable supply of secondary air must be obtained from the atmosphere and directed into and around the fuel mixture in the shroud. Heretofore this has been accomplished without regard to the volume of air needed for complete combustion and controllable flame configuration. The need for a supplementary secondary air supply will be noted when one considers that at atmospheric pressure and 60° F, the volume of one pound of acetylene is 14.53 cubic feet and it requires 11.92 volumes of air or 2.5 volumes of oxygen for its complete combustion. It should be noted that other fuels also involve the use of large volumes of air for complete combustion.

The source of air from pipe 26 alone cannot furnish the mixture of air to cause complete combustion of the gases from pipe 28. Accordingly, it has been found that a secondary source of supply of air from the atmosphere must be fed into the shroud 13 forming the combustion chamber of the fuel burner or heating torch 10 to obtain complete combustion, and it must be done in such a manner so as to properly mix with the expanding and burning gases of air and liquid or gaseous fuel under pressure to contain the burning gases in a suitable configuration.

To accomplish this purpose shroud 13 which forms a combustion chamber is arranged to diverge from its entrance 34 immediately adjacent the bell-shaped flange 24 of nozzle 23 to its outlet 35 spaced therefrom. This shroud is provided with a plurality of air scoop or louvered openings 36 which permit parallel flow of air around the moving and burning gases to further supplement the air supply to aid complete combustion. This air directed around the periphery of the shroud draws air into the burning fuel and keeps the fuel mixture contained within the center of the shroud.

The particular shroud configuration, as more clearly disclosed in U.S. Pat. application, Ser. No. 184,078, filed Sept. 27, 1971 by Carl R. Guth, and entitled "Fuel Mixing Shroud For Heating Torches," now U.S. Pat. No. 3,737,281, granted June 5, 1973 aids air and fuel mixture for more complete combustion within the shroud and immediately outside of its nozzle end by providing a housing formed of a metallic cylindrical member which is tapered from its inlet end to its outlet end by deforming the shroud in a pleated or corrugating manner.

The corrugated shroud 13 provides a plurality of equally spaced wrinkles or ridges 38 and grooves 39 on its outside surface which taper outwardly from the inlet end 34 to outlet end 35. The inside or crests of these grooves 39 provide air passageways for primary air from the inlet 34 of the shroud along the length of the shroud. These passageways in the grooves 39 taper outwardly as the shroud tapers outwardly and provide a means for furnishing air to the fuel injected into the shroud along its longitudinal axis.

In order to provide a drag or retardation to the movement or secondary air into the shroud of the burner, the end of nozzle 23 is provided with the flared or bell shaped configuration 24. As the secondary air is drawn into the shroud, it is slowed down so that it can mix more thoroughly with the fuel mixture being expelled by nozzle 23 into the shroud.

As evident from the drawing the drags formed by the flared ends of nozzles 20 and 23 cause turbulence and eddies immediately downstream of the nozzles opening which aid in thoroughly mixing the fuel and air for complete combustion.

Since more complete combustion occurs than heretofore possible, the shroud heats up to a higher temperature.

By properly introducing the air and fuel mixture into a shroud of the configuration disclosed, the noise of combustion or mixing of the burning fuel may be greatly reduced. In addition, the temperature of the burning fuel is increased without increasing fuel consumption, thereby increasing the efficiency of the burner or torch.

It should be recognized that the tapered combustion chamber compensates for the fuel expansion of the gases during their burning cycle in the combustion chamber, resulting in complete fuel consumption of the burner.

Although the shroud may be formed of special tubing, it can be formed readily of stock tubing, providing a venturi throat configuration. Heretofore, shrouds have been formed by spinning or casting.

As noted from FIG. 1, the nozzle 23 may be adjustably positioned by varying the stud and nut arrangement 14 and 15 to center the jetting gases into the center of the shroud 13 so that the gases may be properly mixed and the secondary air properly heated before mixing with the burning fuels. If the mixed gases are not centrally or axially positioned in the shroud, the resulting flame may not issue axially of the shroud and accordingly may not burn completely to its full heat potential.

Although but one embodiment of the invention has been illustrated and described, it will be obvious to one skilled in the art that various changes and modifications may be made without departing from the spirit of the invention and scope of the appended claims.

What is claimed is:

1. A fuel burner comprising:
a main support element;
a fuel mixing chamber mounted on said support element,
said chamber comprising a hollow housing having mounted therein first and second axially aligned cylindrical nozzle elements,
said first nozzle element having an outside diameter smaller than the inside diameter of said second nozzle element,
said first nozzle element having an outer diameter smaller than the hollow opening of said an and defining a gas expansion space between it and the inside periphery of said hollow opening in said housing,
a gas inlet connected to said space between said first nozzle element and the periphery of said opening in said housing,
said first nozzle element being connected to a first source of gas under pressure for discharging said first gas under pressure into said second nozzle element,
said gas inlet being connected to a second gas under pressure, and
means mounted around the outer periphery of the discharging end of said first nozzle element for providing a drag on the second gas moving past it and into the stream of the first gas being discharged from the end of said first nozzle element,
said means retarding the movement of said second gas over the discharging end of said first nozzle element into the stream of the first gas discharged by said first nozzle element and creating eddies in the mixing first and second gases,
a burner flame shroud having an inlet and an outlet mounted on said support element around the discharge end of said second nozzle element a predetermined distance from the end of said second nozzle element,
said inlet of said shroud being larger than the discharge end of said second nozzle element,
said shroud drawing atmospheric air into said shroud by the effects of aspiration,
said shroud comprising a fluted surface defining an inlet adjacent said support element diverging outwardly to said discharge end,
said fluted surface defining a plurality of grooves on the inside of said shroud which forms air passageways extending along the surface of said shroud from said inlet along at least a part of its length.

2. The fuel burner set forth in claim 1 wherein:
said means comprises a flared end on said first nozzle element.

3. The fuel burner set forth in claim 1 wherein:
said first nozzle element extends within an inlet end of said second nozzle element.

4. The fuel burner set forth in claim 2 wherein:
said first nozzle element extends within an inlet end of said second nozzle element, and said second nozzle element is provided with a flared discharge end.

5. The fuel burner set forth in claim 4 wherein:
said first nozzle element is connected to a source of air under pressure and said second nozzle element is connected to a source of fuel under pressure.

6. The fuel burner set forth in claim 1 in further combination with:
a plurality of air scoop openings arranged within and along the fluted surface of said shroud, said air scoop openings defining secondary air passageways into said shroud for mixing with air and fuel gases in said shroud to aid combustion of said gases.

* * * * *

UNITED STATES PATENT OFFICE
CERTIFICATE OF CORRECTION

Patent No. 3,816,061　　　　　Dated June 11, 1974

Inventor(s) Carl R. Guth

It is certified that error appears in the above-identified patent and that said Letters Patent are hereby corrected as shown below:

Claim 1, line 15, "an" should read -- housing --.

Signed and sealed this 3rd day of December 1974.

(SEAL)
Attest:

McCOY M. GIBSON JR.　　　　　　C. MARSHALL DANN
Attesting Officer　　　　　　　　Commissioner of Patents